US008325785B2

(12) United States Patent
Rofougaran et al.

(10) Patent No.: US 8,325,785 B2
(45) Date of Patent: Dec. 4, 2012

(54) METHOD AND SYSTEM FOR COMMUNICATING VIA A SPATIAL MULTILINK REPEATER

(75) Inventors: Ahmadreza Rofougaran, Newport Coast, CA (US); Maryam Rofougaran, Rancho Palos Verdes, CA (US)

(73) Assignee: Broadcom Corporation, Irvine, CA (US)

( * ) Notice: Subject to any disclaimer, the term of this patent is extended or adjusted under 35 U.S.C. 154(b) by 1202 days.

(21) Appl. No.: 12/116,581

(22) Filed: May 7, 2008

(65) Prior Publication Data
US 2009/0278596 A1 Nov. 12, 2009

(51) Int. Cl.
*H04B 3/36* (2006.01)
(52) U.S. Cl. ........ 375/211; 375/212; 375/213; 375/214; 370/319; 370/320; 370/321; 370/330; 370/335; 370/342; 370/345; 370/347; 333/193; 333/192; 333/195; 333/196
(58) Field of Classification Search .......... 375/211, 375/212, 213, 214; 370/319, 320, 321, 330, 370/335, 342, 345, 347; 333/193, 192, 195, 333/196
See application file for complete search history.

(56) References Cited

U.S. PATENT DOCUMENTS

| 5,200,955 A | 4/1993 | McFarlane et al. |
| 6,697,603 B1 * | 2/2004 | Lovinggood et al. ........ 455/13.1 |
| 7,764,924 B1 * | 7/2010 | Smithey et al. .................... 455/7 |
| 7,813,451 B2 | 10/2010 | Binder et al. |
| 2006/0019604 A1 * | 1/2006 | Hasarchi .......................... 455/15 |
| 2009/0247109 A1 | 10/2009 | Rofougaran |
| 2009/0247213 A1 | 10/2009 | Rofougaran |
| 2009/0279593 A1 | 11/2009 | Rofougaran et al. |
| 2009/0280768 A1 | 11/2009 | Rofougaran et al. |
| 2009/0316829 A1 | 12/2009 | Rofougaran |
| 2009/0318086 A1 | 12/2009 | Rofougaran |
| 2010/0159859 A1 | 6/2010 | Rofougaran |

* cited by examiner

*Primary Examiner* — Zewdu Kassa
(74) *Attorney, Agent, or Firm* — Farjami & Farjami LLP

(57) ABSTRACT

Aspects of a method and system for communicating via a spatial multilink repeater are provided. In this regard, a received signal may be frequency shifted to generate a plurality of repeated signals, wherein each repeated signal may be shifted by a different frequency with respect to the received signal. Each repeated signal may comprise one or more signal components and a phase and/or amplitude of each of the components may be controlled to control a directivity of the repeated signals. Each of the repeated signals may be generated by quadrature down-converting said received signal by mixing the received signal with a first LO signal pair, up-converting the down-converted signal by mixing it with a second LO signal pair, and adding or subtracting an in-phase portion and a quadrature-phase portion of the up-converted signal.

18 Claims, 4 Drawing Sheets

METHOD AND SYSTEM FOR COMMUNICATING VIA A SPATIAL MULTILINK REPEATER

CROSS-REFERENCE TO RELATED APPLICATIONS/INCORPORATION BY REFERENCE

This patent application makes reference to:
U.S. patent application Ser. No. 12/057,780, filed on Mar. 28, 2008, now published as U.S. patent application publication 2009/0247109;
U.S. patent application Ser. No. 12/058,077, filed on Mar. 28, 2008, now published as U.S. patent application publication 2009/0247075;
U.S. patent application Ser. No. 12/116,763, filed on May 7, 2008, now published as U.S. patent application publication 2009/0280768; and
U.S. patent application Ser. No. 12/116,835, filed on May 7, 2008, now published as U.S. patent application publication 2009/0279593.

Each of the above stated applications is hereby incorporated herein by reference in its entirety.

FIELD OF THE INVENTION

Certain embodiments of the invention relate to signal processing. More specifically, certain embodiments of the invention relate to a method and system for communicating via a spatial multilink repeater.

BACKGROUND OF THE INVENTION

As the number of wireless devices and wireless standards continue to grow, wireless communications are increasingly being relied upon to exchange information. For example, Bluetooth, Wi-Fi, and cellular communications (e.g., GSM) are just a few examples of well established wireless communications commonly utilized in today's technology driven societies.

In 2001, the Federal Communications Commission (FCC) designated a large contiguous block of 7 GHz bandwidth for communications in the 57 GHz to 64 GHz spectrum. This frequency band was designated for use on an unlicensed basis, that is, the spectrum is accessible to anyone, subject to certain basic, technical restrictions such as maximum transmission power and certain coexistence mechanisms. The communications taking place in this band are often referred to as '60 GHz communications'.

In this regard, communication at extremely high frequencies (EHF) may enable reducing the size of corresponding communication systems due, for example, to the smaller passive components required. Additionally, EHF systems may enable higher data rates than their lower frequency counterparts. However, a major drawback of operating at extremely high frequencies is that EHF signals have substantially different characteristics in terms of signal propagation than lower frequency signals. In this regard, EHF signals may only be suited for "line-of-site" operation.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for communicating via a spatial multilink repeater, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for communicating via a spatial multilink repeater. In this regard, a received signal may be frequency shifted to generate a plurality of repeated signals, wherein each repeated signal may be shifted by a different frequency with respect to the received signal. Each repeated signal may comprise one or more signal components and a phase and/or amplitude of each of the components may be controlled to control a directivity of the repeated signals. Each of the repeated signals may be generated by quadrature down-converting said received signal by mixing the received signal with a first LO signal pair, up-converting the down-converted signal by mixing it with a second LO signal pair, and adding or subtracting an in-phase portion and a quadrature-phase portion of the up-converted signal. A frequency of one or more of the LO signal pairs may be determined based on a frequency by which one or more of the repeated signals is to be shifted. An amount by which to shift the received signal may be determined based on a receive frequency of a target device for which the received signal may be destined and/or based on noise present in a communication medium. A plurality of repeated signals may be transmitted to a corresponding plurality of target devices. In this regard, one or more target devices may receive on a different frequency than one or more other target devices. Additionally, one or more target devices may be in a different physical location than one or more other target devices. In various embodiments of the invention, the received signal may be repeated a plurality of times en route from a source device to a target device.

Figure 1:
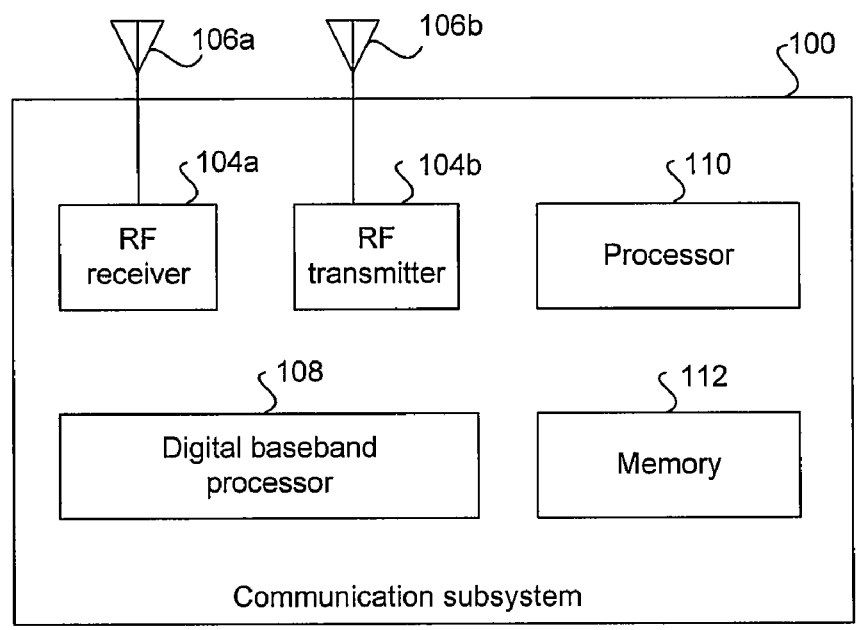
FIG. 1 is a block diagram illustrating an exemplary communication subsystem, which may be utilized in connection with an embodiment of the invention.

FIG. 1 is a block diagram illustrating an exemplary communication subsystem, which may be utilized in accordance with an embodiment of the invention. Referring to FIG. 1, there is shown a communication subsystem 100, an RF receiver 104a, an RF transmitter 104b, a receive antenna 106a, a transmit antenna 106b, a digital baseband processor 108, a processor 110, and a memory 112.

The communication subsystem 100 may comprise the RF receiver 104a, the RF transmitter 104b, the receive antenna 106a, the transmit antenna 106b, the digital baseband processor 108, the processor 110, the memory 112, and may also comprise additional suitable logic, circuitry, and/or code that may enable receiving, transmitting, and processing of RF signals. For example, the communication subsystem 100 may be integrated or located within a wireless device to enable operations in a wireless system. In some embodiments of the invention, the communication system 100 may enable the processing of any form of signals such as, for example, multimedia information, comprising, audio, video, and/or data. Audio may comprise voice, any form of music and/or any form of sound. The processing of signals by the communication system 100 may occur in analog and/or digital format.

The receive antenna 106a may comprise suitable logic, circuitry, and/or code that may enable reception of RF signals. In various embodiments of the invention, the antenna 106a may comprise a plurality of antenna elements and may, for example, be a phased array antenna. The receive antenna 106a may be communicatively coupled to the RF receiver 104a. The RF receiver 104a may comprise suitable logic, circuitry, and/or code that may enable processing of received RF signals. The RF receiver 104a may down-convert received RF signals to a baseband frequency signal. The RF receiver 104a may perform direct down-conversion of the received RF signals to a baseband frequency signal, for example. In some instances, the RF receiver 104a may enable analog-to-digital conversion of the baseband signal transferring the signal to the digital baseband processor 108. In other instances, the RF receiver 104a may transfer the baseband signal in analog form. In various embodiments of the invention, the RF receiver 104a may enable receiving extremely high frequency (EHF) signals at, for example, approximately 60 GHz. In this regard, the RF receiver 104a may be enabled to generate signals, such as local oscillator signals, for the reception and processing of EHF signals. In various embodiments of the invention, the receive antenna 106a and the RF receiver 104a may enable reception of non-EHF RF signals. For example, the receive antenna 106a and the RF receiver 104a may enable receiving and/or processing of Bluetooth RF signals.

The transmit antenna 106b may comprise suitable logic, circuitry, and/or code that may enable transmission of RF signals. In various embodiments of the invention, the antenna 106b may comprise a plurality of antenna elements and may, for example, be a phased array antenna. The transmit antenna 106b may be communicatively coupled to the RF transmitter 104b. The RF transmitter 104b may comprise suitable logic, circuitry, and/or code that may enable processing of RF signals for transmission. The RF transmitter 104b may up-convert the baseband frequency signal to an RF signal. The RF transmitter 104b may perform direct up-conversion of the baseband frequency signal to a RF signal. In some instances, the RF transmitter 104b may enable digital-to-analog conversion of the baseband signal received from the digital baseband processor 108 before up conversion. In other instances, the RF transmitter 104b may receive baseband signals in analog form. In various embodiments of the invention, the RF transmitter 104b may enable transmission of extremely high frequency (EHF) signals at, for example, approximately 60 GHz. In this regard, the RF transmitter 104b may be enabled to generate signals, such as local oscillator signals, for the transmission and processing of EHF signals. In various embodiments of the invention, the transmit antenna 106b and the RF transmitter 104b may enable transmission of non-EHF RF signals. For example, the transmit antenna 106b and the RF transmitter 104b may enable transmitting and/or processing of Bluetooth RF signals.

The digital baseband processor 108 may comprise suitable logic, circuitry, and/or code that may enable processing and/or handling of baseband frequency signals. In this regard, the digital baseband processor 108 may process or handle signals received from the RF receiver 104a and/or signals to be transferred to the RF transmitter 104b. The digital baseband processor 108 may also provide control and/or feedback information to the RF receiver 104a and to the RF transmitter 104b based on information from the processed signals. For example, the digital baseband processor 108 may communicate information and/or data from the processed signals to the processor 110 and/or to the memory 112. Moreover, the digital baseband processor 108 may receive information from the processor 110 and/or to the memory 112, which may be processed and transferred to the RF transmitter 104b for transmission to the network.

The processor 110 may comprise suitable logic, circuitry, and/or code that may enable control and/or data processing operations for the communication subsystem 100. The processor 110 may be utilized to control at least a portion of the RF receiver 104a, the RF transmitter 104b, the digital baseband processor 108, and/or the memory 112. In this regard, the processor 110 may generate at least one signal for controlling operations within the communication subsystem 100. The processor 110 may also enable executing of applications that may be utilized by the communication subsystem 100. For example, the processor 110 may execute applications that may enable displaying and/or interacting with content received via RF signals in the communication subsystem 100.

The memory 112 may comprise suitable logic, circuitry, and/or code that may enable storage of data and/or other information utilized by the communication subsystem 100. For example, the memory 112 may be utilized for storing processed data generated by the digital baseband processor 108 and/or the processor 110. The memory 112 may also be utilized to store information, such as configuration information, that may be utilized to control the operation of at least one block in the communication subsystem 100. For example, the memory 112 may comprise information necessary to configure the RF receiver 104a to enable receiving signals in the appropriate frequency band.

In operation, the communication subsystem 100 may enable communication via one or more RF interfaces. The communication subsystem 100 may be integrated within a wireless device to enable wireless communications. For example, the communication subsystem 100 may receive RF signals via the receive antenna 106a; wherein the RF receiver 104a may enable initial processing of the received signal. The communication subsystem 100 may transmit RF signals via the RF transmitter 104b and the transmit antenna 106b. The digital baseband processor 108, the processor 110, and the memory 112 may enable performing control and/or related operation during transmission and/or reception of RF signals. For example, the processor 110, the digital baseband processor 108, and/or the memory 112 may provide one or more control signals to the receiver 104a and/or the transmitter 104b to control a phase and/or amplitude adjustment of received and/or transmitted signals to take advantage of beamforming.

In various embodiments of the invention, the communication subsystem 100 may enable EHF communications, which may have limited operational range compared with lower frequency RF interfaces. Accordingly, the communication subsystem 100 may be enabled to utilize other wireless interfaces and/or protocols. For example, the communication subsystem 100 may be enabled to utilize such wireless interfaces such as Bluetooth. The non-EHF interfaces that may be supported in the communication subsystem 100 may be utilized to send information regarding the communication subsystem 100. For example, a Bluetooth connection may be utilized to send information regarding the capability of the communication subsystem 100 and/or to receive messages containing information regarding preferred settings that may be utilized while performing EHF communication.

In various embodiments of the invention, repeater devices may be utilized to extend the range of communications between wireless devices that may comprise the communication subsystem 100. In this regard, wireless communications may generally have limited range and it may be desirable to utilize other devices, for example, repeater devices, to extend the range of communications between wireless devices. While it may be desirable to utilize repeater devices in forwarding RF signals between wireless devices, ways to prevent and/or reduce interference between receive and transmit RF signals at such repeater devices may be necessary. Accordingly, aspects of the invention may enable repeating (retransmitting) a signal at a plurality of frequencies and at a different frequency than the frequency at which the signal was received. Moreover, beamforming may be utilized to control the directionality of repeated signals. In this regard, each repeated signal may be split into a plurality of signal components and a phase and/or amplitude of each signal component may be controlled to achieve a desired radiation pattern for each of the repeated signals.

Figure 2:
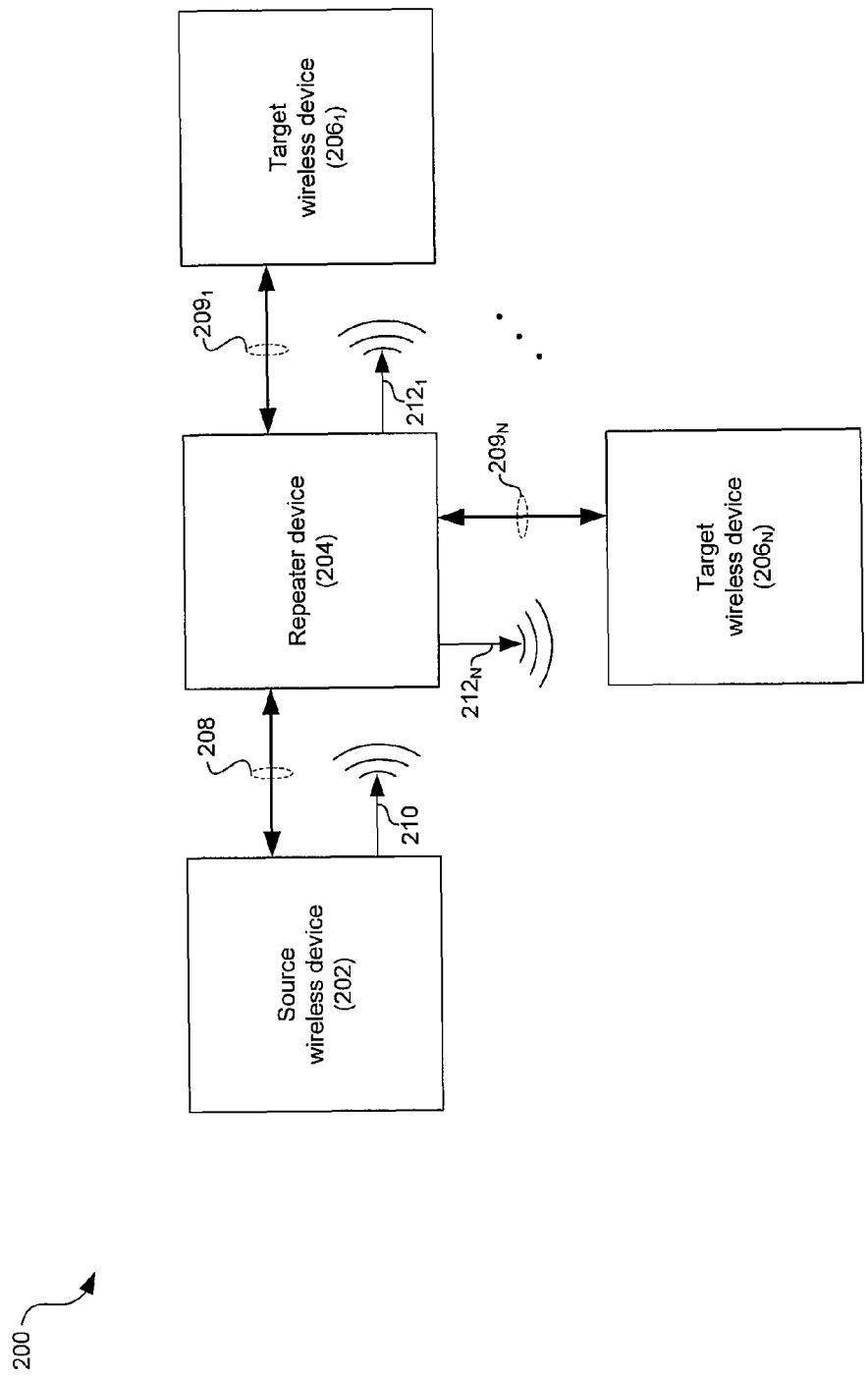
FIG. 2 is a block diagram illustrating a repeater device utilized to forward wireless communications from a source device to a target device, in accordance with an embodiment of the invention.

FIG. 2 is a block diagram illustrating a repeater device utilized to forward wireless communications from a source device to a plurality of target devices, in accordance with an embodiment of the invention. Referring to FIG. 2, there is shown a source wireless device 202, target devices 206$_1$, ..., 206$_N$, a repeater device 204, transmitted signal 210, repeated signals 212$_1$, ..., 212$_N$, and control connections 208, 209$_1$, ..., 209$_N$, where N may be the number of target devices to which the signal 210 may be repeated. The system 200 is only exemplary and other systems may comprise additional source devices, repeater devices, and/or target devices without deviating from the scope of the present invention. Additionally, one or more of the target devices 206$_1$, ..., 206$_N$ may comprise suitable logic, circuitry, and/or code that may enable repeating signals. In some embodiments of the invention, one or more of the source wireless device 202, repeater device 204, target devices 206$_1$, ..., 206$_N$ may comprise suitable logic, circuitry, and/or code that may enable processing of any form of signals such as, for example, multimedia information, comprising, audio, video, and/or data. Audio may comprise voice, any form of music and/or any form of sound. The processing of signals by the source wireless device 202, repeater device 204, target devices 206$_1$, ..., 206$_N$ may occur in analog and/or digital format.

The source wireless device 202 and the target wireless devices 206$_1$, ..., 206$_N$ may each comprise suitable logic, circuitry, and/or code that may enable receiving, transmitting, and processing of RF signals. For example, the source wireless device 202 and the target wireless devices 206$_1$, ..., 206$_N$ may each comprise the communication subsystem 100, substantially as described with respect to FIG. 1.

The repeater device 204 may comprise suitable logic, circuitry, and/or code that may enable reception and/or transmission of an RF signal to facilitate forwarding an RF signal from the source wireless device 202 to target devices 206$_1$, ..., 206$_N$. Accordingly, the repeater device 204 may be enabled to control directionality of the repeated signals 212$_1$, ..., 212$_N$ so as to direct the signals 212$_1$, ..., 212$_N$ to the target devices 206$_1$, ..., 206$_N$, respectively. In this regard, repeated signals 212$_1$, ..., 212$_N$ may each comprise a plurality of signal components and the repeater device 204 may be enabled to control a phase and/or amplitude of the signal components based on the physical location of the target devices 206$_1$, ..., 206$_N$. Additionally, the repeater device 204 may be enabled to control a frequency of each of the repeated signals 212$_1$, ..., 212$_N$. Accordingly, to control frequency and/or directionality of repeated signals 212$_1$, ..., 212$_N$, the repeater device 204 may comprise suitable logic, circuitry, and/or code that may enable configuration of the repeater device 204 based on information received via the control connections 208, 209$_1$, ..., 209$_N$.

The control connections 208, 209$_1$, ..., 209$_N$ may each comprise a wireless and/or wireline link that may be utilized to communicate control messages between the source wireless device 202 and the repeater device 204, and between the repeater device 204 and the target devices 206$_1$, ..., 206$_N$, respectively. For example, the control connections 208, 209$_1$, ..., 209$_N$ may be utilized to determine the target devices 206$_1$, ..., 206$_N$ for a received signal 210, determine a receive frequency of each of the target devices 206$_1$, ..., 206$_N$, and/or determine directionality from the repeater device 204 to each of the target devices 206$_1$, ..., 206$_N$. Exemplary links may comprise a Bluetooth connection and a three wire interface.

In operation, the source device 202 may transmit a signal 210 destined for the target devices 206$_1$, ..., 206$_N$. However, due to factors such as distance and/or physical obstructions, signals from the source device 202 may not reliably reach one or more of the target devices 206$_1$, ..., 206$_N$. For example, extremely high frequency (EHF) communications may be limited to line-of-sight operation. Accordingly, the repeater device 204 may receive the signal 210, having a first frequency, from the source device 202 and repeat (re-transmit) the received signal 210 as signals 212$_1$, ..., 212$_N$, to the target devices 206$_1$, ..., 206$_N$, respectively. The frequency of each of the repeated signals 212$_1$, ..., 212$_N$ may be controlled based on the target devices 206$_1$, ..., 206$_N$ and/or based on the environment in which the signals 212$_1$, ..., 212$_N$ may be transmitted. In this regard, the frequency of the received signal 210 may be shifted to match the receive frequencies of the target devices 206$_1$, ..., 206$_N$ and/or mitigate any sort of interference such as avoiding noisy frequencies. Additionally, the repeated signals 212$_1$, ..., 212$_N$ may be directed to the destination target devices 206$_1$, ..., 206$_N$. In this regard, the repeated signals 212$_1$, ..., 212$_N$ may each comprise a plurality of signal components transmitted via a corresponding plurality of antenna elements and the phase and/or amplitude of the signal components may be controlled to affect the directionality of each of the transmitted signals 212$_1$, ..., 212$_N$.

Figure 3:
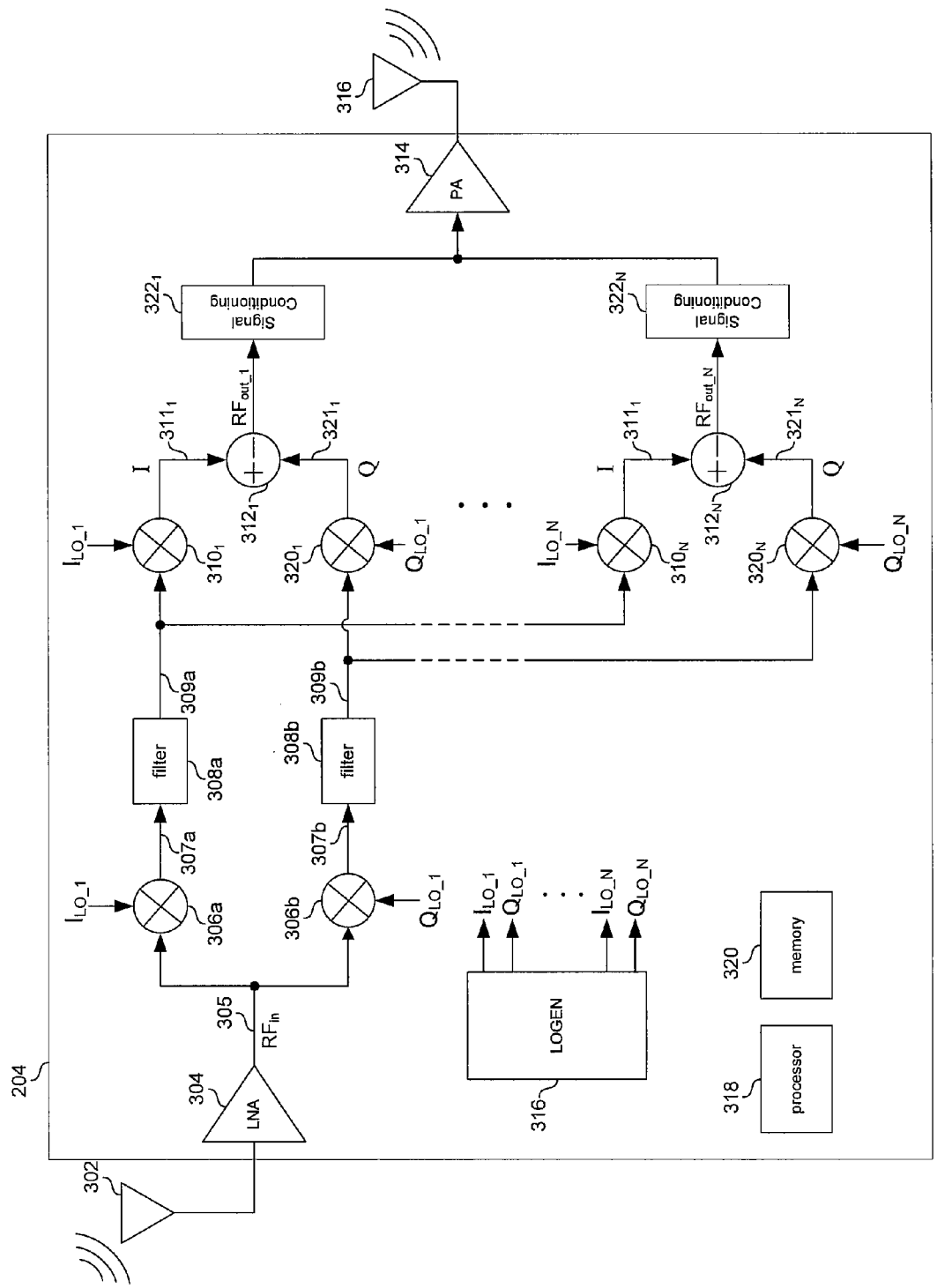
FIG. 3 is a diagram of an exemplary spatial multilink repeater, in accordance with an embodiment of the invention.

FIG. 3 is a diagram of an exemplary frequency shifting repeater, in accordance with an embodiment of the invention. Referring to FIG. 3, the repeater 204 may comprise a low noise amplifier (LNA) 304; mixers 306$a$, 306$b$, 310$_1$, ..., 310$_N$, and 320$_1$, ..., 320$_N$; filters 308$a$ and 308$b$; adders 312$_1$, ..., 312$_N$; power amplifier (PA) 314; signal conditioning blocks 322$_1$, ..., 322$_N$; local oscillator generator (LOGEN) 316; processor 318; and memory 320, where N may be the number of target devices to which a received signal may be repeated. The repeater 204 may comprise or be communicatively coupled to antennas 302 and 316.

The antennas 302 and 316 may be similar to, or the same as, the antennas 106$a$ and 106$b$, respectively. In this regard, the antennas 302 and 316 may each comprise one or more antenna elements and may, for example, comprise a loop antenna, a dipole antenna, or a phased array antenna.

The LNA 304 may comprise suitable logic, circuitry, and/or code that may enable buffering and/or amplification of received RF signals. In this regard, the gain of the LNA 304 may be adjustable to enable reception of signals of varying strength. Accordingly, the LNA 304 may receive one or more control signals from the processor 318 and/or the memory 320.

The mixers 306a and 306b may each comprise suitable logic, circuitry, and/or code that may enable generation of inter-modulation products resulting from mixing the received signal $RF_{IN}$ with the in-phase local oscillator (LO) signal $I_{LO\_1}$ and the quadrature-phase LO signal $Q_{LO\_1}$, respectively. Similarly, the mixers $310_k$ and $320_k$, where k may be an integer between 1 and N, may each comprise suitable logic, circuitry, and/or code that may enable generation of inter-modulation products resulting from mixing the filter outputs 309a and 309b with $I_{LO\_k}$ and $Q_{LO\_k}$, respectively.

The filters 308a and 308b may each comprise suitable logic, circuitry, and/or code that may enable passing frequencies at or near a desired intermediate frequency (IF) and attenuating other frequencies. In this regard, the IF may be given by $f_{305} - f_{LO\_1}$, where $f_{305}$ may be the frequency of the signal 305 output by the LNA 304 and $f_{LO\_1}$ may be the frequency of the signals $I_{LO\_1}$ and $Q_{LO\_1}$ output by the LOGEN 316. In various embodiments of the invention, the bandwidth, attenuation, and/or center frequency of each of the filters 308a and 308b may be adjustable based on one or more control signals. Accordingly, the filters 308a and 308b may each receive one or more control signals from the processor 318 and/or the memory 320.

The adders $312_1, \ldots, 312_N$ may each comprise suitable logic, circuitry, and/or code for adding or subtracting signals. In this regard, the adder $312_k$ may be enabled to add signal $311_k$ to signal $321_k$, subtract signal $311_k$ from signal $321_k$ and/or subtract signal $311_k$ from signal $321_k$. In this regard, the adder $312_k$ may receive one or more control signals to determine whether addition or subtraction is performed. Furthermore, the selection of addition or subtraction may depend on the phasing and/or polarity of one or more of the signals $I_{LO\_k}, Q_{LO\_k}$, 309a, and 309b. For example, $I_{LO\_k}$ may be $\cos(\omega_{LO\_k}t)$ and $Q_{LO\_k}$ may be $\sin(\omega_{LO\_k}t)$ and addition may be selected such that the output of the adder $312_k$ may be $\cos(\omega_{IF}t - \omega_{LO\_k}t)$, where $\omega_{IF} = \omega_{RFin} - \omega_{LO\_1}$. Alternatively, $I_{LO\_k}$ may be $\cos(\omega_{LO\_k}t)$ and $Q_{LO\_k}$ may be $-\sin(\omega_{LO\_k}t)$ and subtraction may be selected such that the output of the adder $312_k$ may be $\cos(\omega_{IF}t - \omega_{LO\_k}t)$, where $\omega_{IF} = \omega_{RFin} - \omega_{LO\_1}$.

The PA 314 may comprise suitable logic, circuitry, and/or code that may enable buffering and/or amplification of an RF signal and outputting the signal to an antenna for transmission. In this regard, the gain of the PA 314 may be adjustable and may enable transmitting signals of varying strength. Accordingly, the PA 314 may receive one or more control signals from the processor 318 and/or the memory 320.

The LOGEN 316 may comprise suitable logic, circuitry, and/or code that may enable generating LO signal pairs $I_{LO\_1}$, $Q_{LO\_1}, \ldots, I_{LO\_N}, Q_{LO\_N}$. In various embodiments of the invention, the signal generator 316 may comprise, for example, one or more VCO's, PLLs, and/or direct digital frequency synthesizers (DDFSs). The frequency of the LO signals output by the LOGEN 316 may be determined based on one or more control signals from the processor 318 and/or the memory 320.

The processor 318 may be similar to or the same as the processors 108 and/or 110 described with respect to FIG. 1. In this regard, the processor may be enabled to control operations of the repeater 204. For example, the processor 318 may provide one or more control signals for configuring the filters 308 and/or the LOGEN 316.

The memory 320 may be similar to or the same as the memory 112 described with respect to FIG. 1. In this regard, the processor may be enabled to store received data and/or information for configuring and/or operating the repeater 304. For example, the memory 320 may store information for configuring the filters 308 and/or the LOGEN 316.

In operation, a signal may be received via the antenna 302 and amplified by the LNA 304 to generate the signal $RF_{in}$. The mixers 306a and 306b may mix $RF_{in}$ with the LO signal pair $I_{LO\_1}, Q_{LO\_1}$. In this regard, the processor 318 and/or the memory 320 may provide one or more signals for controlling the frequency of the LO signal pair $I_{LO\_1}, Q_{LO\_1}$ output by the LOGEN 316. The filters 308a and 308b may filter the output of the mixers 306a and 306b to generate intermediate frequency (IF) signals 309a and 309b. In this regard, the processor 318 and/or the memory 320 may provide one or more signals for controlling the response of the filters 308a and 308b. The mixers $310_k$ and $320_k$ may mix the IF signals 309a and 309b with the LO signal pair $I_{LO\_k}, Q_{LO\_k}$ to generate signals $311_k$ and $311_k$. The adder $312_k$ may add or subtract the signals $311_k$ and $311_k$ to generate $RF_{out\_k}$. In this manner, $RF_{out\_k}$ may be generated by frequency shifting $RF_{in}$ by $-(f_{LO1} + f_{LOk})$, where $f_{LO1}$ is the frequency of the LO signal pair $I_{LO\_1}, Q_{LO\_1}$ and $f_{LOk}$ is the frequency of the LO signal pair $I_{LO\_k}, Q_{LO\_k}$ output by the LOGEN 316. Accordingly, signals received via the antenna 302 may be repeated to k target devices on k frequencies via the antenna 316. Additional details of operation of the repeater 204 may are described below with respect to FIG. 4.

Figure 4:
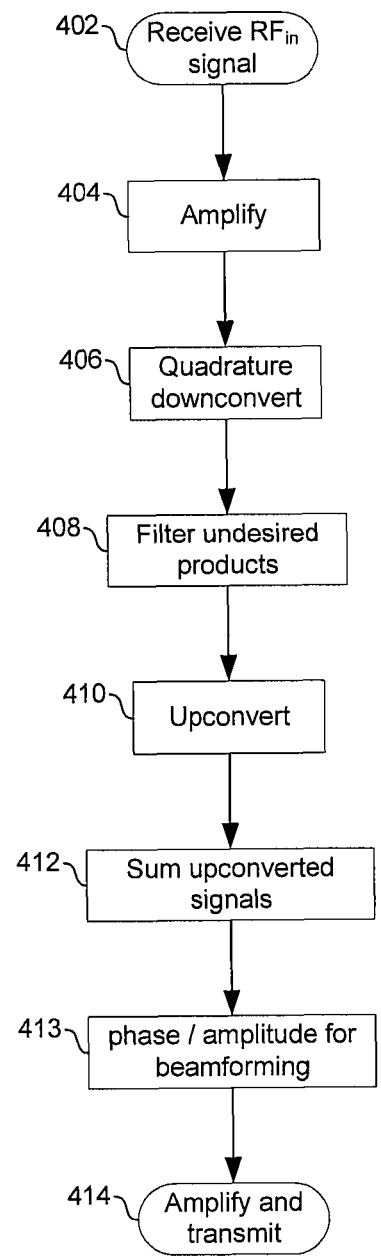
FIG. 4 is a flow chart illustrating exemplary operation of a spatial multilink repeater, in accordance with an embodiment of the invention.

FIG. 4 is a flow chart illustrating exemplary operation of a frequency shifting repeater, in accordance with an embodiment of the invention. Referring to FIG. 4 the exemplary steps may begin with step 402 when a signal may be received by the repeater 204. Subsequent to step 402, the exemplary steps may advance to step 404.

In step 404, the received RF signal may be amplified by the low noise amplifier 304. Subsequent to step 404, the exemplary steps may advance to step 406.

In step 406, the amplified RF signal 305 output by the LNA 304 may be quadrature down converted. In this regard, the mixer 306a may mix the signal 305 with an in-phase local oscillator signal, $I_{LO\_1}$, and the mixer 306b may mix the signal 305 with a quadrature-phase local oscillator signal, $Q_{LO\_1}$. Subsequent to step 406, the exemplary steps may advance to step 408.

In step 408, the signals 307a and 307b output by the mixers 306a and 306b may be filtered to remove undesired mixer products. In this regard, the filter 308a may low pass filter the signal 307a and output $\cos(\omega_{RF} - \omega_{LO\_1})$ and the filter 308b may low pass filter the signal 307b and output $\sin(\omega_{RF} - \omega_{LO\_1})$. Subsequent to step 408, the exemplary steps may advance to step 410.

In step 410, the filtered signals 309a and 309b may be up-converted. In this regard, the mixer $310_k$ may mix the signal 309a with the in-phase local oscillator signal $I_{LO\_k}$ signal to generate $311_k$ and the mixer $320_k$ may mix the signal 309b with the quadrature-phase local oscillator signal $Q_{LO\_k}$ to generate $321_k$. Subsequent to step 410, the exemplary steps may advance to step 412.

In step 412, the adder $312_k$ may add or subtract the up-converted signals $311_k$ and $311_k$ to generate the $RF_{out\_k}$ signal. Accordingly, $RF_{out\_k}$ may be frequency shifted relative to the $RF_{in}$ signal by an amount equal to (within a tolerance) $-(f_{LO\_1} + f_{LO\_k})$. For example, if $RF_{in}$ is 61 GHz, $f_{LO\_1}$ is 250 MHz, and $f_{LO\_k}$ is 150 MHz then $RF_{out\_k}$ may be 60.6 GHz. In this manner, a received signal may be repeated on a different frequency than the frequency on which it is received. In this regard, the frequency of the transmitted signal $212_k$ may be determined based, for example, on a frequency of operation of the target device $206_k$ and/or noise present in and/or around the repeater 204. Subsequent to step 412, the exemplary steps may advance to step 413.

In step 413, the signal $RF_{out\_k}$ may be conditioned by the signal conditioning block $322_k$ such that the repeated signal $212_k$ may be directed at the target device $206_k$. In this regard, the signal conditioning block $322_k$ may adjust a phase and/or amplitude of one or more signal components of the signal $RF_{out\_k}$. Subsequent to step 413, the exemplary steps may advance to step 414.

In step 414, $RF_{out\_k}$ may be amplified by the PA 314 and transmitted via the antenna 316 to the target device $212_k$. In this manner, a repeater may repeat an EHF signal to a plurality of target devices, wherein each of the target devices may be in a different physical location and/or operating on a different frequency.

Thus, aspects of a method and system for communicating via a spatial multilink repeater are provided. In this regard, a received signal 210 may be frequency shifted to generate a plurality of repeated signals 212, wherein each repeated signal 212 may be frequency shifted by a different frequency with respect to the received signal 210. Each repeated signal 212 may comprise one or more signal components and a phase and/or amplitude of each of the components may be controlled, via a signal conditioning block 322, to control a directivity of the repeated signals. Each of the repeated signals 212 may be generated by quadrature down-converting said received signal 310 by mixing, via the mixers 306, the received signal 310 with a first LO signal pair, up-converting the down-converted signal by mixing, via the mixers 310 and 320, it with a second LO signal pair, and adding or subtracting, via an adder/subtractor 312, an in-phase portion and a quadrature-phase portion of the up-converted signal. A frequency of one or more of the LO signal pairs may be determined based on a frequency by which one or more of the repeated signals is to be shifted. An amount by which to shift the received signal may be determined based on a receive frequency of a target device 206 for which received signal may be destined and/or based on noise present in a communication medium. A plurality of repeated signals 212 may be transmitted to a corresponding plurality of target devices 206. In this regard, one or more target devices may receive on a different frequency than one or more other target devices. Additionally, one or more target devices 206 may be in a different physical location than one or more other target devices 206. In various embodiments of the invention, the received signal 210 may be repeated a plurality of times en route from a source device 202 to a target device 206.

Another embodiment of the invention may provide a machine-readable storage, having stored thereon, a computer program having at least one code section executable by a machine, thereby causing the machine to perform the steps as described herein for communicating via spatial multi-link repeater.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for signal processing, the method comprising:
in a device operable to repeat wireless signals:
  receiving a RF signal utilizing a first wireless communication protocol via a first antenna of said device;
  receiving one or more control signals utilizing a second wireless communication protocol;
  down-converting said received RF signal to generate an in-phase baseband signal and a quadrature-phase baseband signal;
  generating a plurality of repeated signals from said in-phase baseband signal and said quadrature phase baseband signal, wherein each of said plurality of repeated signals is phase shifted by a different amount, wherein each of said plurality of repeated signals comprises one or more signal components;
  controlling a phase and/or amplitude of each of said one or more signal components, based on said one or more control signals, to control a directivity of each of said repeated signals.

2. The method according to claim 1, comprising generating each of said plurality of repeated signals by:
  up-converting said in-phase baseband signal and said quadrature-phase baseband signal by mixing said in-phase baseband signal and said quadrature-phase baseband signal with a phase-quadrature local oscillator signal pair, said up-converting resulting in an in-phase up-converted signal and a quadrature-phase up-converted signal; and
  adding or subtracting said in-phase up-converted signal and said quadrature-phase up-converted signal.

3. The method according to claim 2, comprising determining a frequency of said phase-quadrature local oscillator signal pair based on a amount by which one or more of said plurality of repeated signals is to be shifted with respect to said received signal.

4. The method according to claim 1, comprising determining, for one or more of said plurality of repeated signals, an amount by which to shift said received signal based on a receive frequency of a target device for which said received RF signal is destined.

5. The method according to claim 1, comprising transmitting said plurality of repeated signals to a corresponding plurality of target devices.

6. The method according to claim 5, wherein a first portion of said plurality of target devices receives on a different frequency than a remaining portion of said plurality of target devices.

7. The method according to claim 5, wherein a first portion of said plurality of target devices is in a different physical location than a remaining portion of said plurality of target devices.

8. The method according to claim 1, comprising determining whether to add or subtract said in-phase up-converted signal and said quadrature-phase-up-converted signal based on a polarity one or more of said plurality of local oscillator signal pairs.

9. The method according to claim 5, wherein one or more of said plurality of target devices is a repeater device.

10. A system for signal processing, the system comprising: one or more circuits enabled to:
 receive a RF signal utilizing a first wireless communication protocol via a first antenna of said device;
 receive one or more control signals utilizing a second wireless communication protocol;
 down-convert said received RF signal to generate an in-phase baseband signal and a quadrature-phase baseband signal;
 generate a plurality of repeated signals from said in-phase baseband signal and said quadrature phase baseband signal, wherein each of said plurality of repeated signals is phase-shifted by a different amount, and each of said plurality of repeated signals comprises one or more signal components;
 control a phase and/or amplitude of each of said one or more signal components, based on said one or more control signals, to control a directivity of each of said repeated signals.

11. The system according to claim 10, wherein said one or more circuits are enabled to generate each of said plurality of repeated signals by:
 up-converting said in-phase baseband signal and said quadrature-phase baseband signal by mixing said in-phase baseband signal and said quadrature-phase baseband signal with a phase-quadrature local oscillator signal pair, said up-converting resulting in an in-phase up-converted signal and a quadrature-phase up-converted signal; and
 adding or subtracting said in-phase up-converted signal and said quadrature-phase up-converted signal.

12. The system according to claim 11, wherein said one or more circuits are enabled to determine a frequency of said phase-quadrature local oscillator signal pair based on a amount by which one or more of said plurality of repeated signals is to be shifted with respect to said received signal.

13. The system according to claim 10, wherein said one or more circuits are enabled to determine, for one or more of said plurality of repeated signals, an amount by which to shift said received signal based on a receive frequency of a target device for which said received RF signal is destined.

14. The system according to claim 10, wherein said one or more circuits are enabled to transmit said plurality of repeated signals to a corresponding plurality of target devices.

15. The system according to claim 14, wherein a first portion of said plurality of target devices receives on a different frequency than a remaining portion of said plurality of target devices.

16. The system according to claim 14, wherein a first portion of said plurality of target devices is in a different physical location than a remaining portion of said plurality of target devices.

17. The system according to claim 10, wherein said one or more circuits are enabled to determine whether to add or subtract said in-phase up-converted signal and said quadrature-phase up-converted signal based on a polarity one or more of said plurality of local oscillator signal pairs.

18. The system according to claim 14, wherein one or more of said plurality of target devices is a repeater device.

* * * * *